(12) United States Patent
Selles et al.

(10) Patent No.: US 9,638,278 B2
(45) Date of Patent: May 2, 2017

(54) ELECTROMECHANICAL ACTUATOR FOR VEHICLE BRAKE AND BRAKING SYSTEM COMPRISING SUCH AN ACTUATOR

(71) Applicant: MESSIER-BUGATTI-DOWTY, Velizy Villacoublay (FR)

(72) Inventors: Franck Selles, Brie Comte Robert (FR); Eric Evenor, Velizy Villacoublay (FR); Nathanael Richard, Velizy Villacoublay (FR)

(73) Assignee: MESSIER-BUGARRI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 14/541,801

(22) Filed: Nov. 14, 2014

(65) Prior Publication Data

US 2015/0136543 A1   May 21, 2015

(30) Foreign Application Priority Data

Nov. 20, 2013  (FR) ...................................... 13 61383

(51) Int. Cl.
| | | |
|---|---|---|
| *F16D 55/02* | (2006.01) | |
| *F16D 66/00* | (2006.01) | |
| *B64C 25/44* | (2006.01) | |
| *F16D 65/14* | (2006.01) | |
| *B60T 13/74* | (2006.01) | |
| *B60T 17/22* | (2006.01) | |
| *F16D 65/18* | (2006.01) | |

(Continued)

(52) U.S. Cl.
CPC ............ *F16D 66/00* (2013.01); *B60T 13/741* (2013.01); *B60T 17/221* (2013.01); *B64C 25/44* (2013.01); *F16D 65/14* (2013.01); *F16D 65/18* (2013.01); *F16D 2066/006* (2013.01); *F16D 2121/24* (2013.01); *F16D 2125/40* (2013.01); *F16D 2125/48* (2013.01)

(58) Field of Classification Search
CPC .... F16D 65/14; F16D 65/18; F16D 2066/003; F16D 2066/005; F16D 2121/18; F16D 2121/24; F16D 2125/20; F16D 2125/34; F16D 2125/40
USPC ........ 188/1.11 E, 72.1, 72.8, 158, 162, 71.9, 188/156
See application file for complete search history.

(56) References Cited

FOREIGN PATENT DOCUMENTS

| DE | 10 2004 062810 A1 | 9/2005 |
| DE | 10 2010 040426 A1 | 4/2011 |

(Continued)

OTHER PUBLICATIONS

English machine translation of DE 102010040426.*
French Search Report with Written Opinion of French Application No. 13 61383 dated May 21, 2014.

*Primary Examiner* — Christopher Schwartz
(74) *Attorney, Agent, or Firm* — Sughrue Mion, PLLC

(57) ABSTRACT

The invention relates to an electromechanical actuator for a vehicle brake comprising a body (4) in which are arranged an electric motor (5) and a threaded plunger cooperating via a helical link with a nut (8) driven in rotation by the electric motor (5). According to the invention, the nut (8) is mounted to move axially in the body (4) of the actuator between a rest position towards which the nut (8) is pushed back by elastic means, and an active position towards which the nut is displaced against the elastic means when a braking force is applied, the actuator further comprising means for detecting the axial displacement of the nut.

7 Claims, 3 Drawing Sheets

(51) Int. Cl.
    *F16D 121/24*    (2012.01)
    *F16D 125/40*    (2012.01)
    *F16D 125/48*    (2012.01)

(56) References Cited

FOREIGN PATENT DOCUMENTS

| | | |
|---|---|---|
| EP | 1 653 111 A1 | 5/2006 |
| EP | 1 679 453 A1 | 7/2006 |
| FR | 2 875 876 A1 | 3/2006 |
| FR | 2 885 660 A1 | 11/2006 |
| FR | 2 903 162 A1 | 1/2008 |
| FR | 2 989 657 A1 | 10/2013 |
| GB | 2 312 717 A | 11/1997 |
| WO | 01/20188 A1 | 3/2001 |
| WO | 2005/001303 A2 | 1/2005 |

\* cited by examiner

ELECTROMECHANICAL ACTUATOR FOR VEHICLE BRAKE AND BRAKING SYSTEM COMPRISING SUCH AN ACTUATOR

CROSS REFERENCE TO RELATED APPLICATIONS

This application claims priority based on French Patent Application No. 13 61383, filed Nov. 20, 2013, the contents of which are incorporated herein by reference in its entirety.

The invention relates to an electromechanical actuator for a vehicle brake and a braking system comprising such an actuator.

BACKGROUND OF THE INVENTION

An electromechanical actuator of a brake of an aircraft wheel conventionally comprises a plunger provided with a skid and an electric motor suitable for displacing the plunger facing friction members of the brake (a stack of carbon discs for example), so as to exert a braking torque on the wheel tending to slow down the aircraft.

Such actuators are electrically powered and controlled by external control means which receive a braking setpoint and determine a braking force to be applied to the friction members.

It is vital to the safety of the aircraft to ensure, on the one hand, that a controlled braking force is correctly applied, and, on the other hand, that a braking force is not applied in an untimely manner.

The braking setpoint, the electrical power supply and the control of the motors are obviously monitored, but it is also necessary to ensure that the actual behaviour of the actuator does indeed correspond to the expected behaviour.

To monitor the actual behaviour of the actuator, it is possible to implement a first method consisting in detecting the application of a braking force by monitoring variations of the electrical current consumed by the motor of the actuator. This first method presents a significant risk of untimely detection of braking force. It is also possible to implement a second method consisting in incorporating a force sensor directly in the actuator. This second method presents a certain number of drawbacks: costs, sensitivity to the environment, etc.

OBJECT OF THE INVENTION

The subject of the invention is an electromechanical actuator provided with means for detecting whether a braking force is actually applied or not and that does not present the abovementioned drawbacks, as well as a braking system comprising such an actuator.

SUMMARY OF THE INVENTION

In order to achieve this aim, an electromechanical actuator for vehicle brake is proposed which comprises a body in which are arranged an electric motor and a plunger mounted to slide along a sliding axis by protruding from the body of the actuator so as to selectively apply a braking force onto friction members of the brake, the plunger being threaded and cooperating via a helical link with a nut driven in rotation by the electric motor. According to the invention, the nut is mounted to move axially in the body of the actuator between a rest position towards which the nut is pushed back by elastic means, and an active position towards which the nut is displaced against the elastic means when a braking force is applied, the actuator further comprising means for detecting the axial displacement of the nut.

Thus, by detecting the axial displacement of the nut, a detection is made as to whether a braking force is actually applied by the electromechanical actuator. There are means for detecting an axial displacement that are simple and very reliable, which makes it possible, on the one hand, to produce the detection of the braking force by using an inexpensive solution, and, on the other hand, to greatly reduce the risk of untimely detection.

Furthermore, a braking system of a vehicle is proposed that comprises at least one wheel equipped with a brake provided with an electromechanical actuator as described earlier. The braking system comprises control means connected to the actuator and electrical measurement means connected to the contactor and suitable for detecting whether a braking force is actually applied by the actuator.

BRIEF DESCRIPTION OF THE DRAWINGS

The invention will be better understood in light of the following description given with reference to the figures of the attached drawings in which.

DETAILED DESCRIPTION OF THE INVENTION

Figure 1:
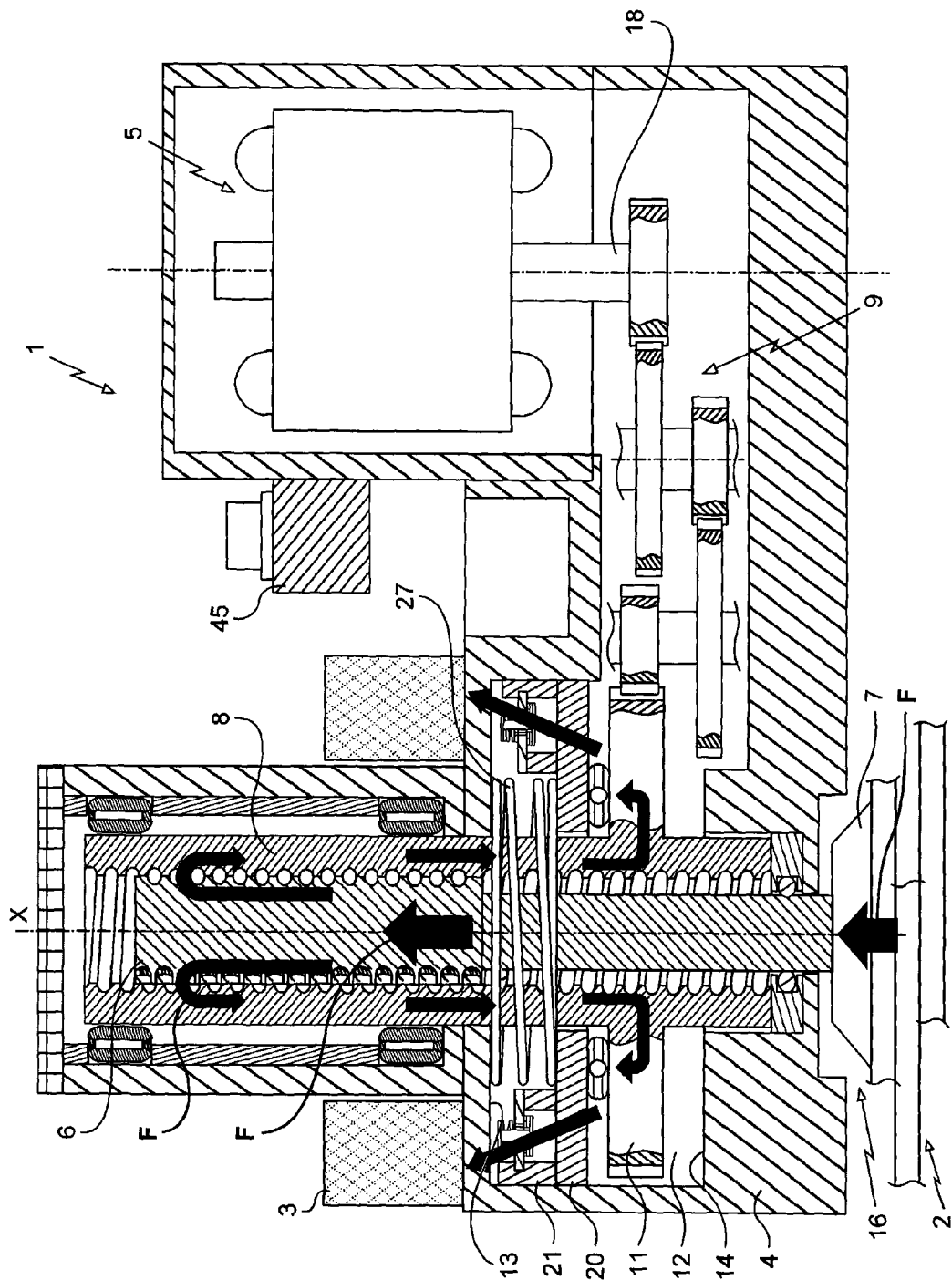
FIG. 1 is a schematic view in cross section of an electromechanical actuator of the invention.

Referring to FIG. 1, an electromechanical actuator 1 of the invention is here intended to selectively apply a braking force onto friction members of a brake of an aircraft wheel, here a stack of carbon discs 2. This actuator 1 is mounted on an actuator-holder 3 of the brake and is fixed to the actuator-holder 3 by virtue of fixing means that are not represented in FIG. 1.

The electromechanical actuator 1 of the invention comprises a body 4 in which are arranged an electric motor 5 and a plunger 6 provided with a skid 7. The plunger 6 is threaded and cooperates via a helical link with a nut 8 driven in rotation by the electric motor 5 via a reduction gear device 9 and a toothed wheel 11 rigidly secured to the nut 8. The toothed wheel 11 extends into a cavity 12 of the body 4 of the actuator 1 between a first internal surface 13 of the body 4 parallel to the toothed wheel 11 and a second internal surface 14 which is also parallel to the toothed wheel 11 and in which an opening 16 is formed, emerging facing the stack of discs 2.

A rotation of a shaft 18 of the electric motor 5 thus provokes a sliding of the plunger 6 in the cavity 12 inside the body 4 of the actuator 1 along a sliding axis X, the plunger 6 protruding from the body 4 of the actuator 1 through the opening 16 to apply the braking force onto the stack of discs 2. An anti-rotation device, not visible in FIG. 1, prevents any rotation of the plunger 6 about the sliding axis X. All this is well known and is recalled only to give the context of the invention.

Figure 2:
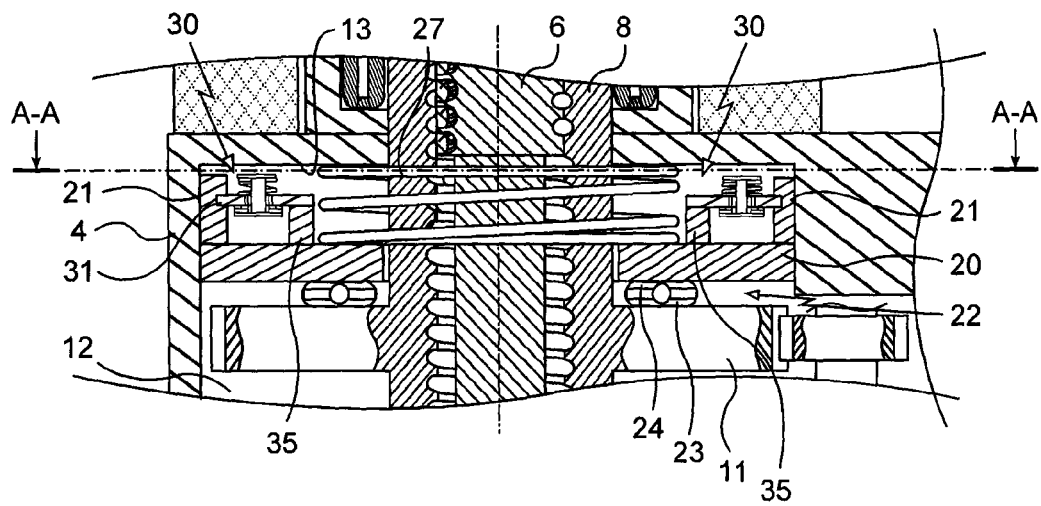
FIG. 2 is a detail view of the actuator of FIG. 1 focusing on the detection means, the nut of the actuator being in a rest position.
Figure 3:
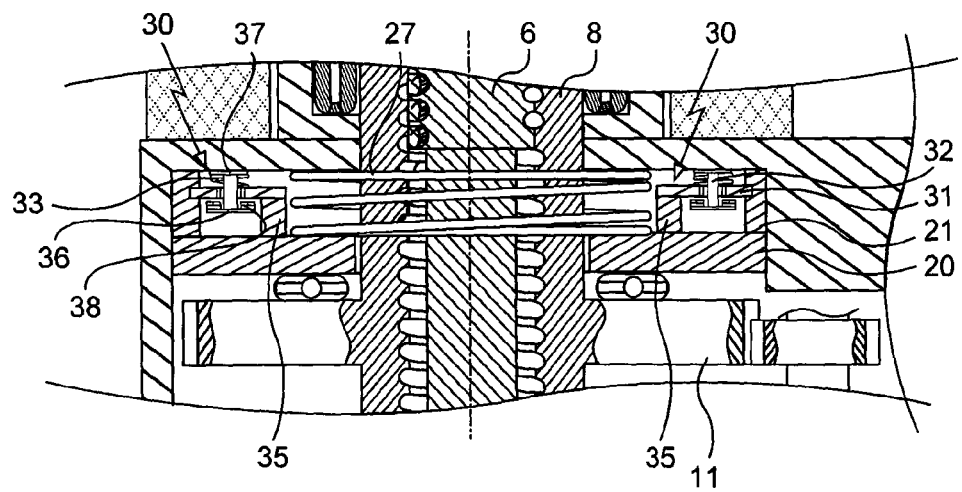
FIG. 3 is a detail view of the actuator of FIG. 1, the nut being in an active position.

The nut 8 is here mounted to move axially in the body 4 of the actuator 1 between a rest position, visible in FIG. 2, and an active position, visible in FIG. 3, in which the toothed wheel 11 is brought towards the first internal surface 13 of the body 4.

The rest position corresponds to a situation in which no braking force is applied. For its part, the active position corresponds to a situation in which a braking force is applied.

The nut 8 is therefore displaced axially when a braking force is applied. This axial displacement results from a reaction force generated by the stack of discs 2 upon a braking, which tends to oppose the braking force. This reaction force is applied by the stack of discs 2 onto the skid 7 of the plunger 6 of the actuator 1, and is then transmitted in succession to the plunger 6 itself, to the nut 8, to the toothed wheel 11, to the body 4 of the actuator 1 and to the actuator-holder 3, along a force path represented by thick arrows F in FIG. 1. This reaction force tends to axially displace the nut 8 and the toothed wheel 11, and to bring the toothed wheel 8 closer to the first internal surface 13 of the body 4.

The cavity 12 of the body 4 of the actuator 1 further comprises a bearing plate 20 of generally annular form situated between the toothed wheel 11 and the first internal surface 13 of the body 4.

The bearing plate 20 extends around the nut 8 and is mounted axially secured to the nut 8 while being free to rotate with respect to the nut. The bearing plate 20 bears via a thrust ball bearing 22 against the toothed wheel 11. This thrust ball bearing 22 comprises a rotating ring 23 secured to the toothed wheel 11 and a fixed ring 24 fixed to the bearing plate 20.

The axial displacement of the nut 8 and of the toothed wheel 11 generates an identical axial displacement of the bearing plate 20, whereas the rotation of the nut 8 and of the toothed wheel 11 is absorbed by the balls of the thrust ball bearing 22 via the rotating ring 23 and is not transmitted to the bearing plate 20. For its part, the reaction force is transmitted from the nut 8 and the toothed wheel 11 to abutment means 21 arranged at the periphery of the bearing plate 20 via the rotating ring 23, the balls and the fixed ring 24 of the thrust ball bearing 22.

When the nut 8 is in the active position and undergoes the axial displacement, the abutment means 21 abut against the first internal surface 13 of the body 4, and take up all the reaction force and transmit it to the body 4 of the actuator 1.

The actuator 1 further comprises elastic means tending to move the bearing plate 20 away from the first internal surface 13 of the body 4 and therefore to push back the nut 8 towards the rest position. These elastic means notably make it possible to ensure that the nut 8 is restored to its rest position when the application of the braking force is finished.

These elastic means extend between the body 4 of the actuator 1 and the bearing plate 20, and here comprise a compression spring 27 having two ends, one of which is fixed to the bearing plate 20 and the other fixed to the first internal surface 13 of the body 4 of the actuator 1. The spring 27 is here calibrated to exert a predetermined calibration force onto the bearing plate 20 tending to move the latter away from the first internal surface 13. Thus, when a braking force is applied, it is the compression spring 27 which first of all takes up the reaction force transmitted by the bearing plate 20, until this reaction force becomes greater than the predetermined calibration force. When the reaction force is greater than the predetermined calibration force, the nut 8 comes into the active position and the abutment means 21 abut against the first internal surface 13.

It will therefore be understood that it is possible to detect that a braking force is applied by detecting the axial displacement of the nut 8 towards its active position, resulting from the application of the braking force, and therefore an axial displacement of the bearing plate 20.

It will also be understood that, by detecting the axial displacement of the bearing plate 20 and by using a compression spring arranged like that described earlier, it is possible to determine a minimum braking force below which no braking force will be detected. This minimum braking force to be detected is equal to the predetermined calibration force of the compression spring 27.

To detect the axial displacement of the bearing plate 20, the bearing plate 20 is provided with at least one contactor 30, in the case here, six contactors 30.

Each contactor 30 comprises an electrical card 31 situated between the bearing plate 20 and the first internal surface 13, a detection element 32 and a holding spring 33.

The electrical card 31 is fixed to the mechanical abutment means 21 and to a support element 35 which is in turn mounted on the bearing plate 20. The detection element 32 comprises a body passing through the electrical card and a planar first end 36 and a planar second end 37 situated on either side of the electrical card 31. The planar first end 36 comprises contacts 38 arranged to close a circuit of the electrical card 31 when the detection element 32 is in a rest position corresponding to a situation in which the abutment means 21 are not in contact with the first internal surface 13. The rest position of the detection element 32 therefore corresponds to the rest position of the nut 8.

When the nut 8 comes into the active position, the planar second end 37 of the detection element 32 comes into contact with the first internal surface 13 of the body 4 of the actuator 1 which has the effect of moving the planar first end 36 away from the electrical card 31 and of opening the circuit of the electrical card 31.

The contactor 30 therefore acts here as a switch which is open when a braking force is applied and closed when no braking force is applied.

The holding spring 33 is arranged between the electrical card 31 and the planar second end 37, and exerts a compression force which tends to push back the planar second end 37 from the electrical card 31 and bring the planar first end 36 closer to the electrical card 31. The detection element 32 is therefore returned to its rest position when the mechanical abutment means 21 are not in contact with the first internal surface 13.

Figure 4:
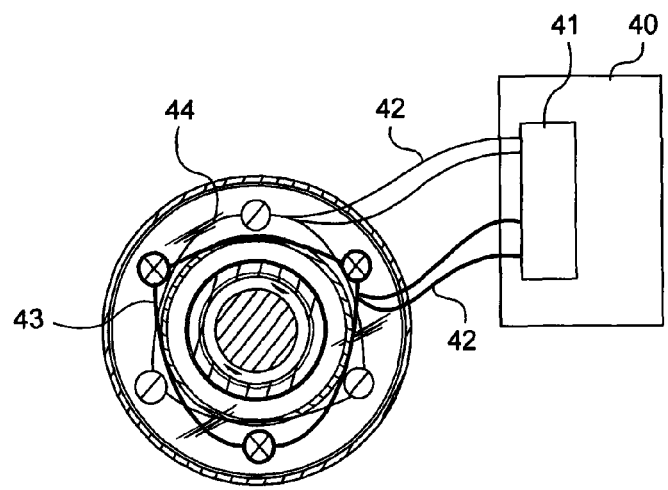
FIG. 4 is a view in cross section along the line A-A of FIG. 1 illustrating six contactors of the actuator of the invention positioned at the periphery of a bearing plate of the actuator.

The invention relates also to a braking system of a vehicle, in this case of an aircraft such as that described previously. This aircraft comprises at least one wheel equipped with a brake provided with an electromechanical actuator similar to the actuator 1 of the invention described previously. The braking system of the invention also comprises external control means 40, schematically represented in FIG. 4, which are notably used to detect whether a braking force is actually applied or not by the electromechanical actuator 1.

The external control means 40 comprise, to this end, electrical measurement means 41 connected to the electrical cards of the six contactors 30 of the actuator 1 via an electrical connector 45 of the actuator that can be seen in FIG. 1 and electrical wires 42. The electrical measurement means 41 are suitable for performing electrical measurements dependent on an open or closed state of the contactors 30 and for deducing from these electrical measurements that a braking force is actually applied or not.

Advantageously, the six contactors 30 of the electromechanical actuator are distributed in a first network 43 of three contactors 30 and a second network 44 of three contactors 30.

The contactors 30 of the first network 43 and of the second network 44 are connected in parallel. Each contactor is represented in FIGS. 5a to 6d by a switch.

The measurement means 41 of the control means 40 comprise a current source 46 generating a measurement current, a series resistor 47 mounted in series with each contactor 30, a first measurement resistor 48 connected to the first network 43 of contactors 30 and a second measurement resistor 49 connected to the second network 44 of contactors 30. The series resistors 47 all have a same resistance value. The first and second measurement resistors 48, 49 also have a same resistance value. The contactors 30, the series resistors 47, the first and second measurement resistors 48, 49 and the current source 46 are electrically connected in accordance with FIGS. 5a to 6d so as to form a first measurement circuit 50 comprising the contactors 30 of the first network 43 and a second measurement circuit 51 comprising the contactors 30 of the second network 44.

Figure 5A:
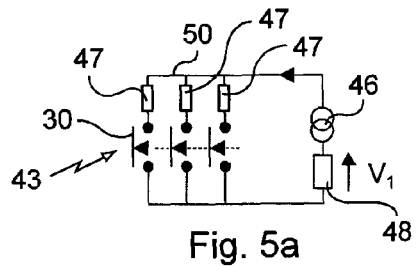
FIGS. 5*a* and 5*b* are circuit diagrams of a first and a second measurement circuits in which the contactors of the actuator of the invention are connected, in a nominal operating mode, when a braking force is applied.
Figure 5B:
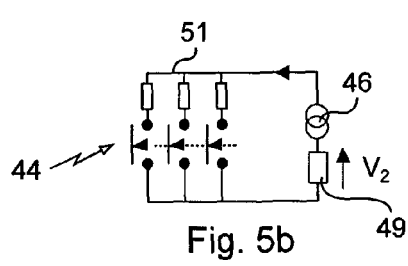

In nominal operation, referring to FIGS. 5a and 5b, the contactors 30 of the first and second networks 43, 44 are all open when a braking force is applied. The voltage V1 measured at the terminals of the first measurement resistor 48 and the voltage V2 measured at the terminals of the second resistor 49 are then both substantially zero.

Figure 5C:
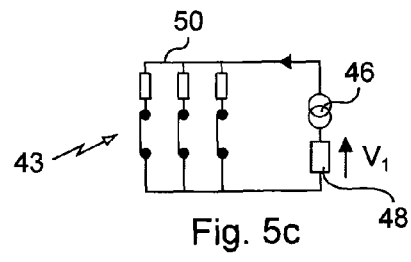
FIGS. 5*c* and 5*d* are figures similar to FIGS. 5*a* and 5*b* illustrating the first and second measurement circuits in a nominal operating mode, when no braking force is applied.
Figure 5D:
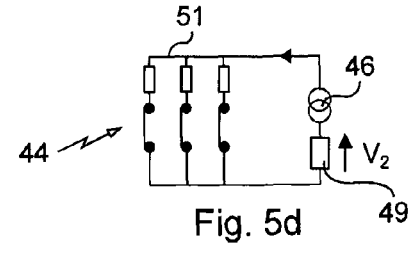

Similarly, in nominal operation, referring to FIGS. 5c and 5d, the contactors 30 of the first and second networks 43, 44 are all closed when no braking force is applied. The voltages V1, V2 measured at the terminals of the first resistor 48 and the second resistor 49 are then non-zero and substantially identical.

This particular arrangement of the contactors 30 and of the measurement means 41 further makes it possible to detect and identify cases of failures, which notably makes it possible to avoid any braking force being detected in an untimely manner.

Figure 6A:
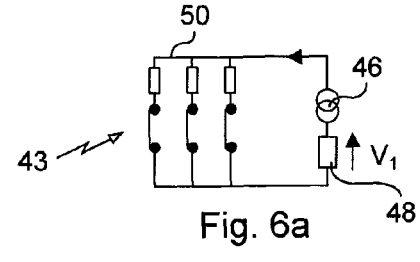
FIGS. 6*a* and 6*b* represent the first and second measurement circuits, in a case of failure of holding springs of two contactors of the second measurement circuit, when no braking force is applied.
Figure 6B:
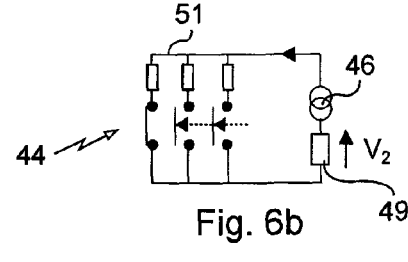
Figure 6C:
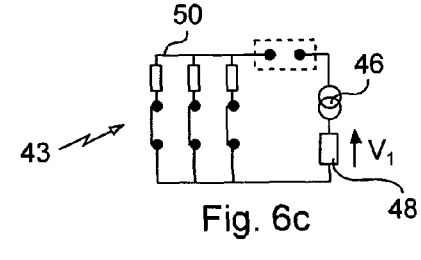
FIGS. 6*c* and 6*d* are figures similar to FIGS. 6*a* and 6*b* illustrating the first and second measurement circuits in a case of open circuit occurring on the first measurement circuit, when no braking force is applied.
Figure 6D:
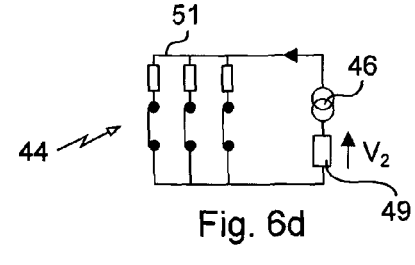

In the case of a fault involving rupturing of the holding spring of one or more contactors 30, these contactors 30 are kept permanently in an open state. FIGS. 6a and 6b represent a situation in which no braking force is applied, and in which two holding springs 33 of two contactors 30 of the second network 44 are faulty. The second voltage V2 measured at the terminals of the second measurement resistor 49 is different from the first voltage V1 measured at the terminals of the first measurement resistor 48, because the measurement current passes through a single series resistor 47 of the second measurement circuit 50 and not three series resistors 47, as is the case for the first measurement circuit 50. This particular dissimilarity between the measured voltages makes it possible to detect the fault of rupture of the holding springs 33.

In the case of an open circuit fault occurring in the first measurement circuit 50, revealing for example a cut wire, the first voltage V1 measured at the terminals of the first measurement resistor 48 is zero whereas the second voltage V2 measured at the terminals of the second resistor 49 is non-zero. This particular dissimilarity between the measured voltages makes it possible to detect the open circuit fault.

The invention is not limited to the particular embodiment which has just been described, but, quite to the contrary, encompasses any variant falling within the context of the invention as defined by the claims.

Although it has been described that the bearing plate bears against the toothed wheel via a thrust ball bearing, it would have been possible to use a different abutment in place of the thrust ball bearing, for example a thrust roller bearing or a needle thrust bearing.

The invention claimed is:

1. An electromechanical actuator for vehicle brake comprising:
    a body (4) in which are arranged an electric motor (5) and a plunger (6) mounted to slide along a sliding axis (X) by protruding from the body (4) of the actuator so as to selectively apply a braking force onto friction members (2) of the brake, the plunger being threaded and cooperating via a helical link with a nut (8) driven in rotation by the electric motor (5),
    wherein the nut (8) is mounted to move axially in the body (4) of the actuator between a rest position towards which the nut (8) is pushed back by elastic means, and an active position towards which the nut is displaced against the elastic means when a braking force is applied, the actuator further comprising means for detecting the axial displacement of the nut,
    wherein the elastic means comprise a calibrated compression spring (27) extending between the body (4) and a bearing plate (20) which extends around the nut by being secured axially to the nut (8) while being free in rotation with respect to the nut,
    wherein the detection means comprise at least one contactor (30) suitable for detecting an axial displacement of the bearing plate (20), and
    wherein the at least one contractor comprises a plurality of contactors (30) distributed in a first network (43) of contactors (30) connected in parallel and a second network (44) of contactors (30) connected in parallel.

2. A braking system of a vehicle comprising at least one wheel equipped with a brake provided with an electromechanical actuator according to claim 1, the braking system further comprising control means (40) connected to the actuator and comprising electrical measurement means (41) connected to the contactor and suitable for detecting whether a braking force is actually applied by the actuator.

3. The braking system of a vehicle according to claim 2, in which the measurement means comprise a first measurement resistor (48) connected to the first network (43) of contactors (30) and a second measurement resistor (49) connected to the second network (44) of contactors (30).

4. The braking system of a vehicle according to claim 3, in which the control means (40) are suitable for detecting a fault on one of the networks of contactors when the voltages measured by the measurement means at the terminals of the first measurement resistor (48) and of the second measurement resistor (49) are different.

5. The braking system of a vehicle according to claim 4, in which the control means (40) are suitable for detecting an open circuit fault on one of the networks or a fault of a holding spring (33) arranged to keep a contactor (30) in closed position when no braking force is applied.

6. The electromechanical actuator according to claim 1, in which the bearing plate (20) bears via an abutment against a toothed wheel secured to the nut.

7. The electromechanical actuator according to claim 6, in which the abutment is a thrust ball bearing.

* * * * *